United States Patent
Van Duijn

(10) Patent No.: US 9,630,154 B2
(45) Date of Patent: Apr. 25, 2017

(54) APPARATUS AND METHOD FOR CONTACTING A GAS AND A LIQUID

(76) Inventor: Albert Van Duijn, Oude Ade (NL)

(*) Notice: Subject to any disclaimer, the term of this patent is extended or adjusted under 35 U.S.C. 154(b) by 81 days.

(21) Appl. No.: 14/237,959

(22) PCT Filed: Aug. 9, 2012

(86) PCT No.: PCT/NL2012/050555
§ 371 (c)(1),
(2), (4) Date: Mar. 13, 2014

(87) PCT Pub. No.: WO2013/022346
PCT Pub. Date: Feb. 14, 2013

(65) Prior Publication Data
US 2015/0085600 A1 Mar. 26, 2015

(30) Foreign Application Priority Data
Aug. 10, 2011 (NL) .................................. 2007250

(51) Int. Cl.
*B01F 5/06* (2006.01)
*B01F 3/04* (2006.01)
(Continued)

(52) U.S. Cl.
CPC .............. *B01F 5/0688* (2013.01); *B01D 3/24* (2013.01); *B01D 3/28* (2013.01); *B01F 3/04985* (2013.01)

(58) Field of Classification Search
CPC ... B01D 3/24; B01D 3/28; B01D 3/16; B01D 3/166; B01D 3/26; B01D 5/0015
See application file for complete search history.

(56) References Cited

U.S. PATENT DOCUMENTS

| 2,051,545 A | 8/1936 | Collins |
| 2,787,453 A * | 4/1957 | Hibshman ............... B01D 3/24 202/158 |

(Continued)

FOREIGN PATENT DOCUMENTS

| EP | 0956121 | 11/1999 |
| GB | 1221064 | 2/1971 |

OTHER PUBLICATIONS

NL Search and Written Opinion, NL2007250, Feb. 6, 2012, 10 pages.

*Primary Examiner* — Tony G Soohoo
*Assistant Examiner* — Elizabeth Insler
(74) *Attorney, Agent, or Firm* — Edell, Shapiro & Finnan, LLC

(57) ABSTRACT

A gas and a liquid are contacted in an apparatus, comprising a housing provided with: a liquid supply; at least two inclined plates that have been arranged in series and that are on a liquid side in fluid communication with the liquid supply; and a gas supply that is in fluid communication with a space at the other, gas side of the plates;
wherein at least some of the plates, preferably all plates are provided with gas passage openings, which openings have been arranged downstream of the gas supply and have been provided with projecting channels with downstream directed flow openings on the liquid side that is in contact with the liquid; and wherein the plates are configured such that liquid flows from one plate directly onto a downstream plate via a slit-formed passage in a substantially vertical downwards direction.

15 Claims, 8 Drawing Sheets

(51) Int. Cl.
*B01D 3/24* (2006.01)
*B01D 3/28* (2006.01)

(56) References Cited

U.S. PATENT DOCUMENTS

| | | | |
|---|---|---|---|
| 3,305,454 A * | 2/1967 | Cowley | B01D 1/2887 |
| | | | 202/182 |
| 3,464,679 A | 9/1969 | Becker | |
| 3,550,916 A | 12/1970 | Hoppe et al. | |
| 3,807,143 A | 4/1974 | Dunn | |
| 3,830,706 A | 8/1974 | Kogan | |
| 4,477,396 A * | 10/1984 | Wilkinson | F25B 35/00 |
| | | | 165/60 |

* cited by examiner

APPARATUS AND METHOD FOR CONTACTING A GAS AND A LIQUID

FIELD OF THE INVENTION

The present invention relates to an apparatus for contacting a gas and a liquid. The invention also relates to a method for contacting of a gas and a liquid.

BACKGROUND OF THE INVENTION

Such a device is known from EP0956121. This patent document describes how in a device a gas and a liquid are contacted by moving a liquid and a plate, which is provided with gas-throughput openings provided with projecting channels, into opposite directions, for example, by flowing the liquid along the surface of the plate, which is inclined for this purpose. This flow creates a venturi effect resulting in a negative pressure in the downstream directed openings of the gas-throughput openings. The bubbles of gas that in this manner are sucked through these openings into the liquid have substantially no overpressure relative to the surrounding liquid. As a result they do not expand, and do not quickly escape towards the surface of the liquid flow but are carried along as elongated gas bubbles in the liquid flow over a relatively long path. In addition to the resulting intense gas-liquid contact, this method offers the advantage that the gas can be fed to the gas-throughput openings at a relatively slight overpressure.

However, the mass transfer and overall performance of a device described above was found not to be satisfactory, in particular when treating "difficult" liquids, such as foaming liquids and/or liquids having a relatively high viscosity or cohesion or a relatively high concentration of solids.

From research it emerged that in the downstream parts of the relatively long path along which the liquid flows over plates provided with the gas-throughput openings, a considerably lower mass transfer occurred than in the upstream parts thereof.

It appeared that when treating said liquids the conditions, desirable for a good venturi action, such as uniform thickness, velocity and impact of the film-shaped flow of liquid, became disturbed already after a relatively short path over the plate. It was found from applications in the field and further research, that the required uniform thickness of the film-shaped flow of liquid was disrupted when, after a relatively short path over an inclined plate, this flow contracts and becomes thicker to the longitudinal axis of the plate causing the liquid film on both sides of said thickening to become thinner. Where thin spots in the liquid film are formed, this film may disrupt entirely ('break') with the result that a part of the gas that flows through the gas-throughput passages can flow through the apparatus without contacting the liquid. This problem occurs to a greater extent in case of liquids with higher viscosity and/or cohesion.

Another cause for the lower mass transfer in the downstream part was found to reside in the considerably lower gas flow rate through the gas-throughput openings, caused by a lower venturi effect in this location and, as a consequence, by a lower negative pressure in these openings which are downstream directed. It was found that the flow becomes saturated with gas bubbles already after a relatively short stretch of the plate. Since such a gas-saturated flow does not have the impact which is desirable for a sufficient venturi effect, the gas throughput at the more downstream portion of the plate is considerably lower than at the more upstream portion. The velocity of the liquid flow, desirable for a proper venturi effect, is adversely affected during its flow over the plate resulting in a loss of kinetic energy which loss is caused by the venturi action. This loss of kinetic energy, in combination with a reduction of the impact and mass of this flow, results in that the venturi action, and as a consequence the gas flow through the gas-throughput openings, is considerably lower at the more downstream part of a relatively long inclined plate than at the more upstream portion. It was found that these effects reduce the gas throughput and the mass transfer of the device. In order to enable the treatment of the above 'difficult' liquids and widen the field of application this problem has to be solved.

A further effect of the above-described decrease of the venturi action at the more downstream part of the plate and the saturation of the liquid film with gas bubbles, occurring there, is that the gas supplied at low pressure is not, or only partly, sucked into the flow and as a consequence forms a gas layer underneath this flow which lifts it locally. This lifting of the liquid flow also results in that a part of the gas, that flows through the gas-throughput openings, passes the device without contacting the liquid. This effect also occurs to a larger extent at liquids with a high content of solids and relatively viscous liquids with a strong cohesion.

In U.S. Pat. No. 3,830,706 a method is described to redistribute a film of liquid again over the width of a plate by passing it over inclined plates provided with apertures, and encountering baffles. The baffles have been arranged such that they, together with the plates form a slit. Through the slits the liquid films may be redistributed over the width of the plates. Although the uniformity of the film may be restored by this method, the baffles cause the flow to lose velocity and turbulence which is desired for a good venturi action and optimal gas-liquid contact. Therefore the use of a slit-shaped gap between a baffle and the plate did not provide a good venturi action and hence failed to improve the mass transfer.

As described in EP 0956121 elongated gas bubbles are being formed over a relatively long path which bubbles are entrained in the liquid flow. Therefore, a substantial part of the gas escapes from the liquid only when this arrives in the liquid-collection reservoir which is located at the downstream end of the inclined plates on the underside of the devices according to this prior art. Depending on the composition of the liquid, this leads to the formation of a foam layer which is built up from this reservoir so that gas-throughput openings are covered by foam. This foaming is also disadvantageous because the gas stream supplied to the apparatus is contacted with the surface of the foam which is accumulating in the liquid-collection reservoir and with the liquid which is present therein, so that the gas is moistened. This results in that the solids that may be present in the liquid, will deposit and accumulate on the downward facing side of the plates provided with gas-throughput openings, so that these openings can clog. It is clear that this will have a negative influence on the mass transfer.

SUMMARY OF INVENTION EMBODIMENTS

The objective of the present invention is to eliminate these disadvantageous effects occurring in the devices according to the prior art, and, by doing so, to improve the mass transfer capability.

The hereto found method and apparatus achieves this objective by repeatedly redistributing, accelerating and degassing the film-shaped liquid flow after having passed a relatively short portion of its path along the plate provided with gas-throughput passages.

It has been found that the liquid flow can be degassed, accelerated and redistributed by passing the liquid film along a series of relatively short plates, wherein the liquid flow flows directly from one plate to another via slit-formed passage in a substantially vertical downwards direction.

Accordingly, the present invention provides an apparatus for contacting a gas and a liquid, comprising a housing provided with:
  a liquid supply;
  at least two inclined plates that have been arranged in series and that are on a liquid side in fluid communication with the liquid supply; and
  a gas supply that is in fluid communication with a space at the other, gas side of the plates;
wherein at least some of the plates, preferably all plates are provided with gas passage openings, which openings have been arranged downstream of the gas supply and have been provided with projecting channels with downstream directed flow openings on the liquid side that is in contact with the liquid; and wherein the plates are configured such that liquid flows from one plate directly onto a downstream plate via a slit-formed passage in a substantially vertical downwards direction. The slit-formed passages may preferably be formed by two plates that gradually narrow the opening between them, thereby providing a tapering opening that creates the slit-formed passage. The tapering opening that creates the slit-formed passage is thus preferably formed between the lower end of one plate optionally provided with gas passage openings and the upper end of the next lower plate, optionally provided with gas passage openings.

The invention further provides a process for contacting a gas and a liquid, wherein a liquid film is passed over at least two inclined plates that have been arranged in series and some of which, preferably all of which have been provided with gas passage openings, which openings have been provided with projecting channels with downstream directed flow openings on the liquid side that is in contact with the liquid, wherein the thickness of the liquid film is adjusted such that the downstream directed flow openings are immersed in the liquid film, wherein gas is contacted with the liquid film via the gas passage openings, and wherein the liquid film is passed from one plate directly onto a downstream plate via a slit-formed passage in a substantially vertical downwards direction. The slit-formed passages may preferably be formed by two plates that gradually narrow the opening between them to create a tapering slit-shaped opening between them, so that the liquid film is suitably passed in a substantially vertical direction via a passage that is narrowing to a split-formed opening.

Owing to the at least two inclined plates that have been arranged in series the liquid flow rate is enhanced by directly passing the liquid flow from the first plate to the next plate downstream. By directly is understood that the liquid flow does not flow along a surface but is allowed to freely fall from one plate to the next. The venturi effect of the next plate downstream is improved by the increased velocity of the liquid that is obtained. Moreover, at the flow end of the plate a redistribution of the liquid film over the width of the plate takes place.

In U.S. Pat. No. 2,051,545 an apparatus for promoting liquid-to-liquid contact or liquid-to-gas contact is described wherein a plurality of rows of inclined perforated plates are arranged in a column, wherein each plate is attached at its upper end to a trough and is immersed in another trough at its lower end. Liquid is allowed to flow downwards over the plates into the troughs and subsequently from the next trough over the next plate. At each trough the liquid is divided into two streams. Lighter liquid or gas is passed upwards through the perforations in the plates. Since the liquid, flowing over the plates is accumulated in the troughs and split into two streams the flow velocity is basically brought to zero. Hence, the velocity of the liquid at the plates is relatively low and the contact is therefore suboptimal. Moreover, in the apparatus of U.S. Pat. No. 2,051,545 the liquid at the end of a plate is collected in a trough which serves as a seal and from which it flows along the side of this trough onto the next plate. It is clear that since it does not flow directly from one plate downwards onto the next plate, the prior art apparatus causes a considerable hydraulic resistance, which makes it unfit for the intended applications.

A gas absorption apparatus is described in GB 1221064. This apparatus comprises a plurality of perforated plates or nets place one above another with a spacing therebetween and extending zigzag one after another downwardly at a predetermined inclination. The gas passes through the perforations and is contacted with a liquid that flows on the inclined plates or nets. It is evident that in the absence of projecting channels in this configuration no venturi effect occurs. Hence also in this case the contact and thus the mass transfer is suboptimal.

Preferably the apparatus according to the invention comprises slit-shaped passages that are formed by a first feed plate and a second downstream arranged plate. In this way, it is further achieved that a large part of the gas bubbles that are entrained in the liquid flow are expelled, so that degassing occurs, by which the above-mentioned risk of foam-formation is reduced.

These advantages are achieved in accordance with the invention, in which the at least two paths are provided by means of at least two plates. Suitably, the slit-formed passage is configured by a plate and a ridge of the plate that is arranged downstream thereof. In this way a slit-shaped gap is created between these plates. As a result, the liquid film on the next plate will be uniformly applied and at least a portion of the entrained gas is removed from the liquid film thereby enhancing the venturi-effect.

In a particularly advantageous embodiment, such inclined plates are arranged one above the other in a zigzag fashion. The liquid can then flow through a streamlined, into a gap narrowing, passage from an upper plate to the underlying next plate. In this way, the plates can easily be arranged in a space-saving triangular constellation. The flow velocity, impact and even thickness needed for an optimum venturi-effect are thus repeatedly restored as the liquid flows directly from one plate onto the next plate below through a substantially vertical passage where it accelerates because of gravitational force. At the same time a considerable portion of entrained gas bubbles escape from the flow due to the narrowing of the passage and the centrifugal forces exerted on the liquid when its direction is changed. When passing through the slit-formed passage onto the next plate the film is redistributed to an even thickness.

Since the gas is supplied over two or more paths it is possible to recover energy from the gas that is caught between these paths. The skilled person will understand that energy can also be supplied to such gas, if desirable. To this end the device according to the invention is preferably provided with means for heat exchange with the gas. This is particularly advantageous if the device is operated in a counter-current application. Moreover, by using such means it is possible to heat or, if desired, cool the gas. This is also advantageous if the apparatus is used for a cross-flow application. The gas can be heated or cooled in various ways. One possible way is to feed cold or hot additional gas, e.g., superheated steam. Preferably, the gas is, however, heated or cooled, via indirect heat exchange. To this end the device according to the invention is preferably equipped with condenser elements.

It is possible to arrange the heat-exchange means outside as well as inside the housing of the apparatus according to the invention. Preferably, they are located inside; more preferably they are arranged within the housing in the spaces through which the gas flows after having left the liquid film. In such spaces the gas flows after having left the film on one plate and before it enters the film on a higher plate.

Accordingly, after the gas has left the liquid film the gas is preferably subjected to heat exchange. In this way a compact apparatus is obtained.

Alternatively, the means for heat exchange are located outside the housing and a gas supply is provided which extends from the side of the plate that is in contact with the liquid, via the means for heat exchange and debouches into the space for the gas of the next plate. In this way, the apparatus may be less compact, but the maintenance of the means for heat exchange can be carried out more easily.

The plates themselves are usually provided as flat plates with gas-passage openings having downstream directed flow openings which are formed in such a way that the liquid flowing along the plate, as a result of the venturi effect, generates a negative pressure in these openings. The openings in the plates may be shaped as described in EP0956121. According to this patent louvered openings are preferred. Also in the present invention the gas flow openings are preferably louvered.

As stated above, the unsatisfactory performance of apparatuses according to the prior art manifests itself mainly on applications where liquids with higher concentrations of solids and higher viscosity and/or cohesion have to be treated. The present invention makes it possible to treat also these 'difficult' media and can be used in a wider range of applications. It is possible for instance to treat waste water streams that contain non-volatile, less-volatile, non-vaporizable or less-vaporizable constituents with gas, e.g. air, so that these components are concentrated and more easily retrievable or processable. Examples are not only found in the process industry, but also in the processing of waste in agriculture and horticulture. It is also possible to strip volatile components from waste streams.

For applications where a relatively low liquid flow rate is desired, it is advantageous to apply at least one distribution element in the length of the plate in the form of a longitudinal ridge or elevation. To this end, distribution elements can be executed as strips. It is also possible to use corrugated plates with the gas-throughput openings arranged in the channels formed by the corrugation. The flow rate desirable for an optimal venturi-effect is achieved in these channels at a substantially lower total flow rate of the liquid film.

As indicated above, the present invention also relates to a method for the contacting of liquid and gas. Similar to the method according to EP0956121, in this method the gas may be brought into contact in cross-flow with the liquid. The advantage of the method according to the present invention however, is that the gas can also be passed in counter-current. Such a method is preferred. It appeared that the method has hardly any tendency to fouling.

BRIEF DESCRIPTION OF THE DRAWINGS

The device according to the invention is further elucidated with reference to the following figures, in which:

FIGS. 2 and 2a show a preferred embodiment of the invention in a zigzag configuration;

DETAILED DESCRIPTION

Figure 1:
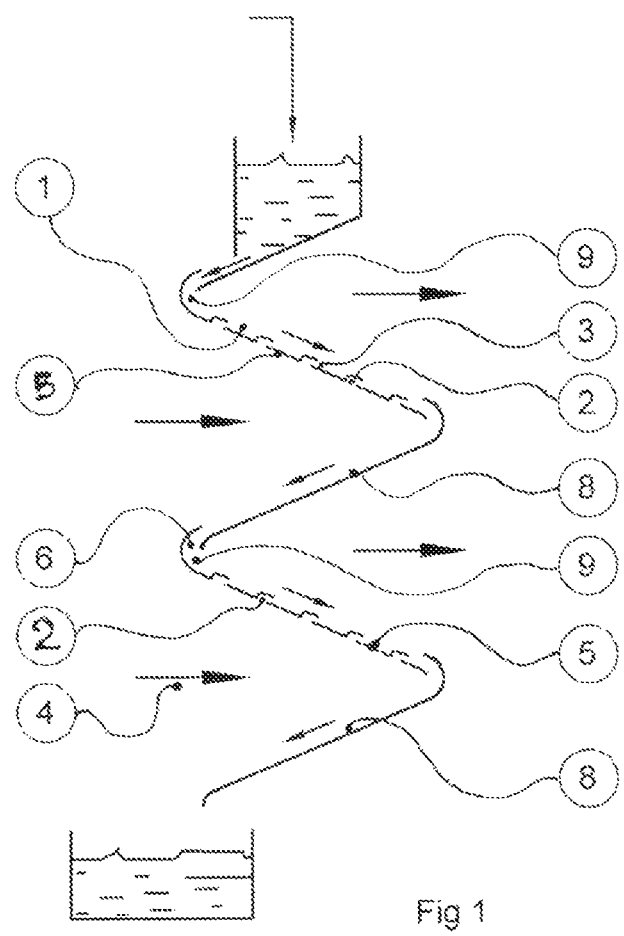
FIG. 1 schematically shows plates used in the apparatus according to the invention, wherein part of the plates contain gas passage openings.

FIG. 1 shows schematically how the flow of liquid (1) is passed over at least two inclined plates (5) which are provided with gas passage openings (2), which, on the side of the plate which is in contact with the liquid, are provided with channels with downstream-directed gas flow openings (3), where the thickness of the liquid film (1) is set such that the openings (3) of the gas passage openings are completely immersed in the liquid film.

From the low end of each plate (5), the liquid (1) is fed, via an closed feed plate (8) inclined in the opposite direction, to the high end of the next plate (5). During the passage over the inclined closed plate the liquid flow rate increases. The desired redistribution of the liquid over the width of the plate is obtained since the flow from the closed feed plate (8) on a plate (5) having gas passage openings, takes place via a relatively narrow slit-formed passage (9) which is formed by the edge (6) of the following plate (5). This narrowing causes also that a large part of the gas bubbles entrained in the liquid flow is expelled by which the above described risk of foam formation is reduced. The closed liquid flow in this slit-shaped passage (9) prevents also the unwanted flow of gas (4) through this opening. A further acceleration of the liquid flow takes place when the liquid flows directly from feed plate (8) to the downstream plate (5) in a vertical direction through the slit-formed passage (9) due to gravitational force.

The desired inclination of such a plate (5) can easily be determined by the skilled person. Factors include for example, the viscosity of the liquid, the desired thickness of the film and the desired rate of flow of the liquid film in order to achieve a good venturi-performance. Usually, the desired angle is in the range of 20° to 85° with respect to the horizontal plane, preferably from 30° to 70°. The optimal to set angle of inclination is therefore dependent on the properties of the liquid and other conditions, at an angle greater than 85° the effect of the component of the force of gravity becomes small and then the fluid stays in contact with the surface of the plate mainly as a result of the above-mentioned Coanda effect, and the generated gas pressure differential. However, in that case, the exerted relatively low gas-supply pressure will cause the liquid flow to lose contact with the plate which causes that it is not flowing uniformly along the flow openings (3) of the projecting channels of gas passage openings (2). If the angle would be less than 20° then the velocity of the liquid (1) would be insufficient to cause the above described venturi effect.

Figure 2:
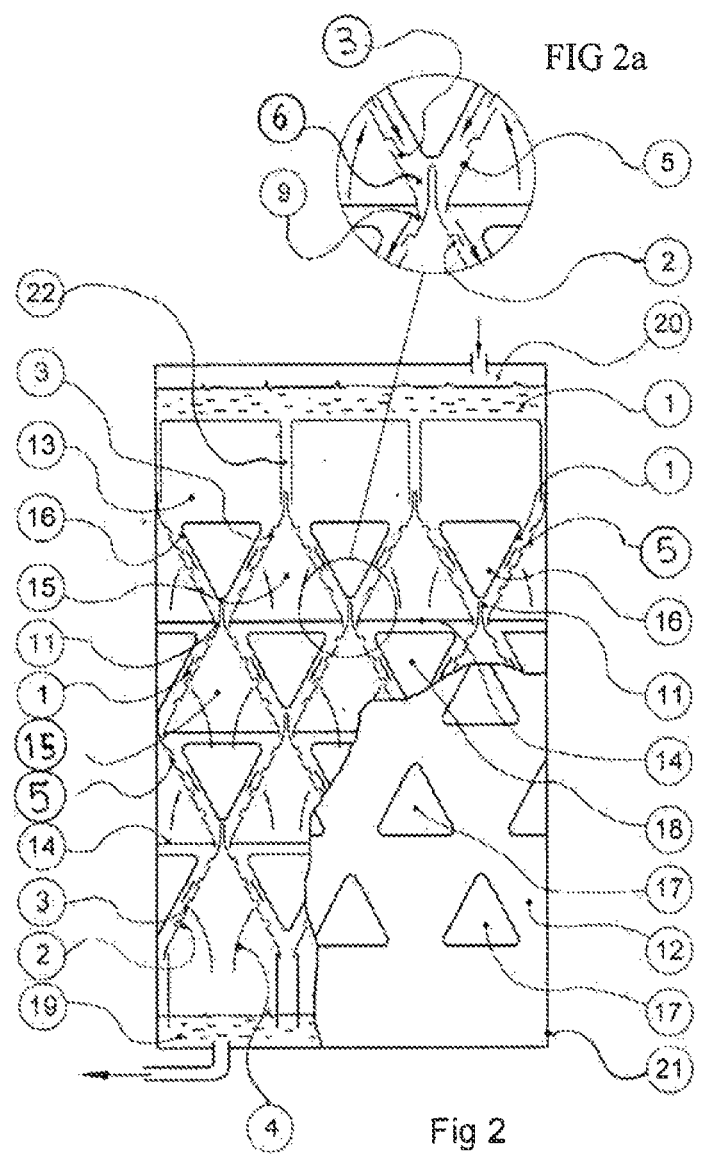

FIG. 2 and detail FIG. 2a show a preferred embodiment of an apparatus to execute the invented method in which these advantages are also achieved. The apparatus comprises a housing (21), including a package of relatively short elevated plates (5) having a plurality of gas passage openings (2), that are arranged in a diamond shaped configuration. It further comprises an upper reservoir (20), a lower reservoir (19), means (not shown) to supply the gas into the triangular channels (15), underneath the plates (5), and means (not shown) to supply liquid (1) to the upper reservoir (20). If necessary, liquid can be pumped back from the lower reservoir (19) to the upper reservoir (20) by means of a recirculation pump (not shown). In certain applications, such as dewatering, it may be desirable to reduce the concentration of solids in this recirculating flow by leading this flow in whole or in part, through a filter which retains these solids.

The inclined plates (5), arranged one above the other, provided with gas-passage openings (2), arranged between a front wall (12) and a parallel rear wall (13) of the housing and are connected in series for the liquid (1) in a zigzag fashion. These plates (5) and separator plates (14) form triangular elements serving together, with the front and rear wall (12 and 13), as gas supply and gas discharge channels (15 and 16, respectively) with a triangular cross section. The separator plates (14) thereby close the passage for the gas in the vertical direction. Gas is passed via de openings (17) that are arranged in the front wall (12) and via the gas supplies (15) to the gas passage openings (2) in the plates (5). The liquid to be treated (1) flows from the upper reservoir (20) through the vertical passages (22) to achieve the initially desired velocity and forms a film shaped flow of liquid on the first, uppermost, plates (5). Then the liquid flows down at a relatively high velocity, following a zigzag path, to the lower reservoir (19). The movement of the liquid causes, by venturi action, a sub atmospheric pressure in the downstream directed openings (3) of the channels projecting from the gas passage openings (2) so that gas from the space (15) underneath the plates (5) is drawn into the liquid flow (1). At the lower end of each relatively short plate the mixed flow of gas and liquid enters a mainly vertical, tapering opening (6) that narrows to a slit-formed passage (9) through which the film shaped flow is passed at a different direction on the upstream end of the next plate below. An important feature of this streamlined passage is that the film whilst passing from an upper to a lower plate through the mentioned slit-formed passage (9) forms a dynamic seal for the gas. The seal does not diminish the velocity of the flow of liquid but is adequate to prevent the passage of gas. This seal thus formed by the film-formed flow is desired when contacting the gas counter-currently with the liquid, as will be explained hereafter, and is possible because the gas, due to the venturi action, can be supplied to the entrances of the gas passage openings at atmospheric to slightly super-atmospheric pressure. After passing and breaking out of this liquid film the gas leaves the apparatus through the gas discharge channels (16) and the openings (18) in the rear wall (13). Between the front and the rear wall (12, 13) of the apparatus and the plates that are held between them, seals are not needed because a possible small quantity of leakage fluid along the inner sides of the front and rear wall in the liquid flow is fed back so that a seal-less, sanitary device is obtained. Manual or high-pressure cleaning is possible in a simple manner via the gas inlet and outlet openings (17 and 18, respectively) in the front and rear wall (12 and 13, respectively), which offer sufficient space and are easily accessible. An apparatus according to FIGS. 2 and 3 makes a very compact construction possible and therefore offers the possibility to arrange the apparatuses both vertically and horizontally in a modular way to any desired capacity.

The above described apparatus, by leading the liquid through the apparatus in a zigzag fashion over the surface of relatively short plates and thereby passing the above mentioned streamlined narrowing passages, solves the described problems and provides valuable extra improvements to apparatuses according to the prior art.

The above described saturation of the flow of liquid with gas bubbles and the resulting problems of:
excessive foam formation in the lower reservoir,
the loss of impact of the flow and
the formation of a layer of gas underneath the flow of liquid
is solved by degassing the gas mixed liquid flow a number of times before it arrives in the lower reservoir. This is achieved by the streamlined passages ((6) where a considerable portion of the gas bubbles escape due to the narrowing of this passage and the centrifugal forces exerted on the liquid when its direction is changed.

The problem of suboptimal mass transfer caused by contraction and non-uniform thickness of the film-shaped flow is solved by passing the liquid over the surfaces of relatively short inclined plates (5) having a plurality of gas passage openings (2). These plates are connected in series for the liquid in a zigzag fashion. Because of the limited length of these plates the liquid is, before said contraction occurs, passed from one plate onto the next lower plate through the streamlined passages (6) that are narrowing to split-shaped passages (9) which divide the flow again to a film of uniform thickness over the full width of the plate.

To compensate for the loss of kinetic energy of the flow due to the energy consumed by the venturi action and the redistribution of the flow to an even thickness, the flow, when passing through the mainly vertical streamlined passages (6), is accelerated under the influence of gravity to restore its velocity.

In addition to improving mass transfer the apparatus according to the invention provides other valuable improvements, such as the possibility to clean the internal surfaces of the apparatus mechanically or by hand, a low cost construction, the possibility to contact the gas with the liquid in cross flow as well as in counter current, the possibility to recover thermal energy from the liquid and/or the gas, and a more compact full modular design.

The method and apparatus according to the prior art offers only the possibility to lead the gas through the apparatus in a, horizontal, cross flow direction. Similar to the method according to EP0956121, the device as described above and shown in FIG. 2 contacts gas with the liquid in cross flow. An important advantage of the method according to the present invention is that this same device can be used to contact the gas also in counter current with the liquid or in a combination of the two directions. This characteristic is very useful for a vast range of applications.

The apparatus according to the present invention as shown in FIG. 2 and which is described above contacts gas with liquid in a cross flow but offers, with some minor alterations, also the possibility to contact the gas with the liquid in a countercurrent fashion.

Figure 3:
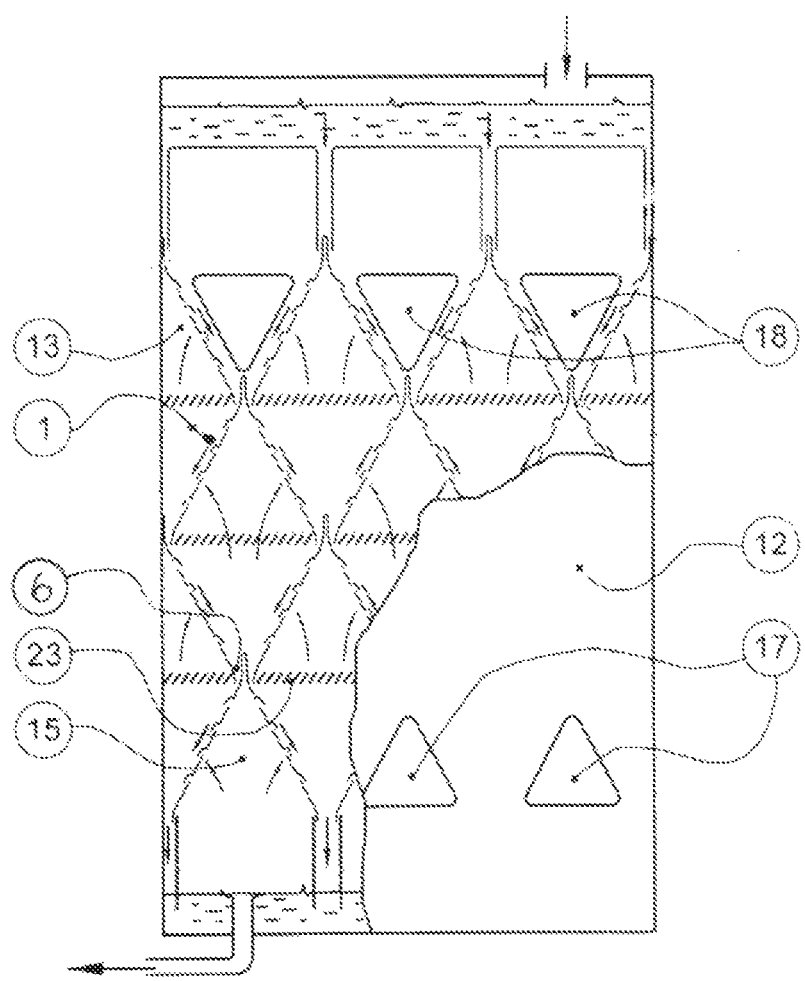
FIG. 3 shows a modification of the invention according to FIG. 2.

FIG. 3 shows how this apparatus by means of some slight modifications can also be used to pass gas in counter current with liquid. This counter current operation can be established very simply by covering almost all the triangular in- and outlet openings (17 and 18) in the walls (12) and (13), and keeping only the lowest row of openings (17) open to let the gas in and the uppermost row of openings (18) open to let the gas out. When working in this mode, openings in the separator plates (14) are made to allow the gas to flow upward or, as shown here, such plates can be replaced by demister plates (23).

The apparatus as shown in FIG. 3 offers also the possibility to choose how many times the gas will pass through the liquid (1) by simply opening and closing the openings 17 and 18 in the walls (12 and 13) and the openings in the plates (14).

As explained before, the velocity of the film shaped flow of liquid is important to reach sufficient turbulence and venturi action. The initial velocity of the liquid when entering on the upstream end of the uppermost inclined plate therefore is to be adapted to the viscosity and cohesive characteristics of the liquid. The apparatus according to the present invention comprises means to achieve this such as a float controlled valve in the liquid supply line, which regulates the liquid level in the upper reservoir and also means to adjust the capacity of the flow of liquid.

Besides that this construction, as shown in FIGS. 2 and 3, improves the mass transfer of the system it offers some additional advantages such as a much higher compactness and the possibility to clean the internal surfaces by hand or high pressure jet via the gas in- and outlet.

To facilitate the construction of large capacity units the apparatuses are constructed as three types of modules that can be mounted on top of each other as well as next to each other. The base module stands in a reservoir and the top module contains the top reservoir. The third type of module can mounted between these modules to construct a column to any required height by just placing more modules on top of each other.

To facilitate the assembly of the apparatuses on site without skilled labour, the modules described above can be transported as parts and built together completely without welding by using click connections.

The venturi action by which elongated air bubbles are carried along within a very turbulent flow results in a very intensive gas-liquid contact and as a consequence to an very high mass transfer between them. It was found that this characteristic, in combination with the above described possibility to pass the gas in counter current with the liquid, offers the possibility to reuse a surprisingly high proportion of the energy, that comes free at condensation, to heat the liquid to be evaporated.

Because gas is supplied to two paths it is possible to recuperate energy from the gas between these paths. The skilled person will understand that energy can also be supplied to such gas, if desirable.

Figure 4:
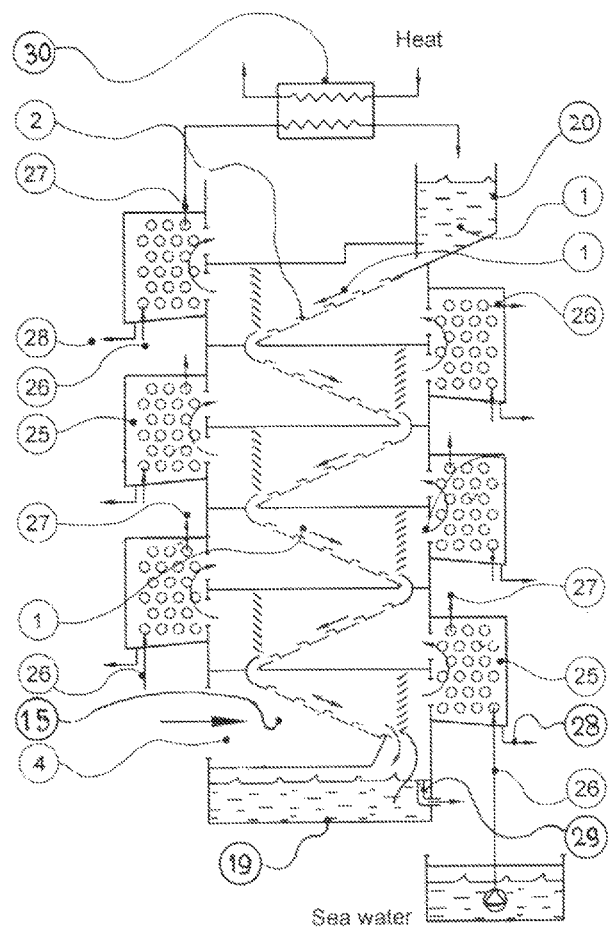
FIG. 4 shows an embodiment with heat-exchange means outside the housing.

FIG. 4 shows an apparatus according to the present invention for distillation in which condensation energy is reused for evaporation. In this embodiment the means for heat exchange are located outside the casing and a passage for gas is provided which extends from the side of the plate which is in contact with the liquid, via an optional demister plate, through the means for heat exchange into the space for the gas underneath the next higher plate. In this way, the apparatus may be less compact, but the maintenance of the means for heat exchange can be carried out more easily.

Cold liquid (e.g. sea water) is fed to the inlet (26) of a lowest heat exchange element (25) having an outlet (27) for this liquid which is connected with the inlet (26) of the next higher positioned heat exchange element (the connecting pipes between outlets (27) and inlets (26) are not shown). The liquid to be distilled, e.g seawater, flows in upward direction through this series of heat exchange elements and is passed from the outlet (27) of the most upward element via heater (31) into the upper reservoir (20). From there the heated water flows down as a film shaped flow (1) following a zigzag path towards the lowest reservoir (19). Gas (4) is fed into a space (15) underneath the lowest inclined plate and passes by venturi action trough the film of liquid. During this passage through the liquid the gas assumes, because of the intense gas-liquid contact, substantially the temperature of the liquid or slightly lower and becomes saturated with vapour at the prevalent temperature. When it subsequently passes through the heat exchanger (25), vapour from the gas condenses on the cooler surfaces thereof causing the gas to cool and the cold seawater to rise in temperature. After this the gas passes the warmer flow of liquid film on the next higher plate where it again rises in temperature and becomes saturated with vapour at this higher temperature. This process is stepwise repeated when the gas flows upwards through the apparatus and thereby on each plate absorbs heat from the warmer flow of liquid, which heat is conveyed by condensation to the seawater that flows upward through the series of heat exchangers. In this manner a big portion of the energy needed for the evaporation is recovered. The number of stages can be extended by simply adding more inclined plates and heat exchange elements to form an extremely effective distillation tower. The condensate is collected at the condensate outlets (28) and is fed to a condensate tank (not shown).

The concentrate which accumulates in the lower reservoir (19) leaves the apparatus via an overflow outlet opening (29).

This application of the invention for multi stage distillation is very attractive because the direct, intensive, contact of the elongated gas bubbles with the surrounding turbulent flow of liquid in which they are dragged along causes an extremely high gas-liquid mass transfer, causing the temperature difference between the gas escaping from the liquid and this liquid to be very small. This offers the possibility to divide an available temperature range in many more stages than is possible with conventional distillation columns. Therefore a device according the present invention through which the gas flows in counter current with the liquid can be used as a multiple stage distillation column in which a high proportion of the evaporation energy can be recuperated.

Figure 5:
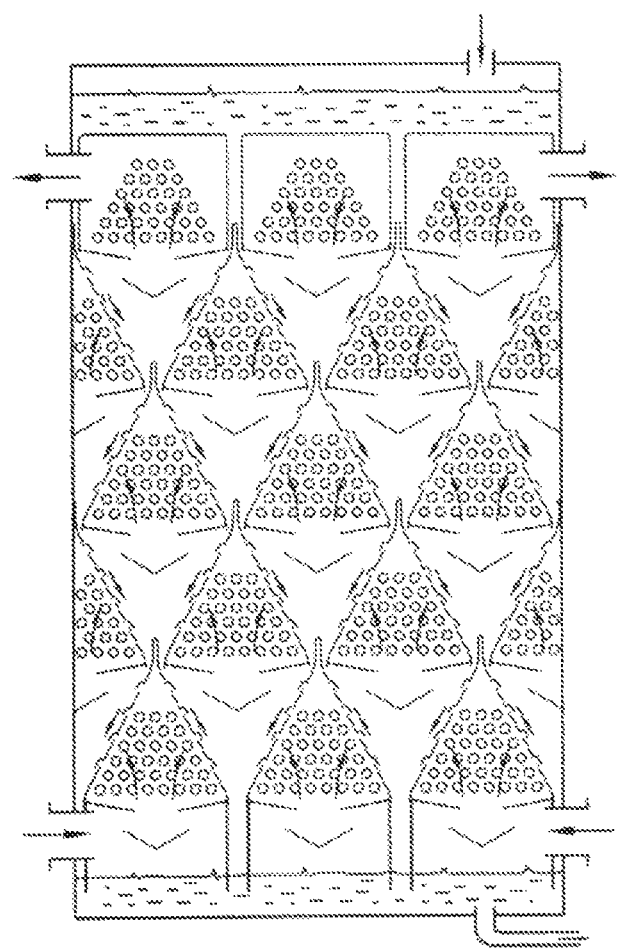
FIG. 5 shows an alternative embodiment with heat exchange means inside the housing.

FIG. 5 shows schematically how the condenser elements can be incorporated in a device that contacts the liquid and the gas in countercurrent as shown in FIG. 3. Here, the condenser elements are mounted within the housing and the condensate can be collected in channels in the form of inverted cones. In this way a particularly compact device for heat recovery is obtained.

Figure 6:
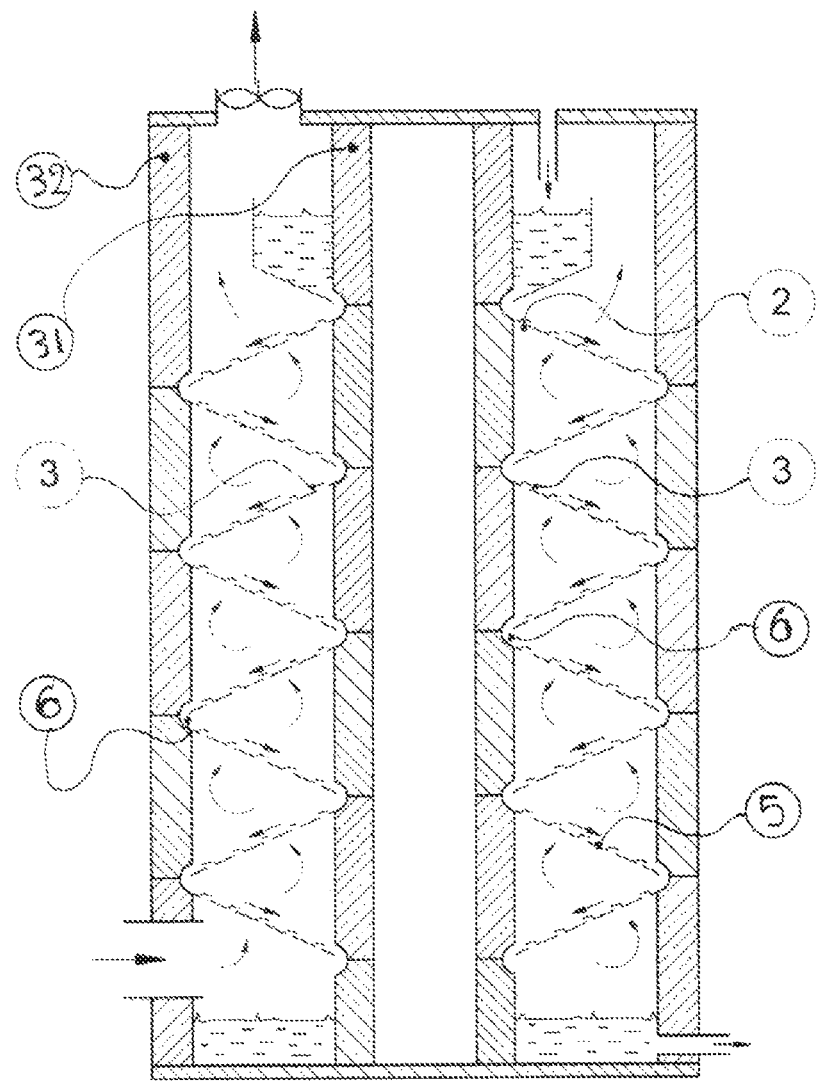
FIG. 6 displays use of the device according to the invention, in a distillation column.

FIG. 6 shows a cross-sectional view of a distillation column with a cylindrical shape according to the present invention in which the gas flows upward through the column, in counter-current with the liquid. Gas (4) flows through the preferably downstream directed flow openings (3) of the channels of gas passage openings (2) that are present on plates (5). These plates are formed as cone-shaped discs which are stacked alternately in opposite directions between inner ring (31) and concentric outer ring (32). The discs are shaped such as to form a tapering opening (6) to the slit-formed passage to pass the liquid in a substantially vertical direction from an upper cone-shaped disc onto a lower cone-shaped disc causing the liquid flow to accelerate, to be degassed and to be redistributed to a uniform thickness. This causes the gas to contact the liquid that flows down along the surface of the cones at each passage thereof. Not shown are the discharge openings, if desired for example during a distillation or fractionation process, to draw off a portion of the liquid.

Figure 7:
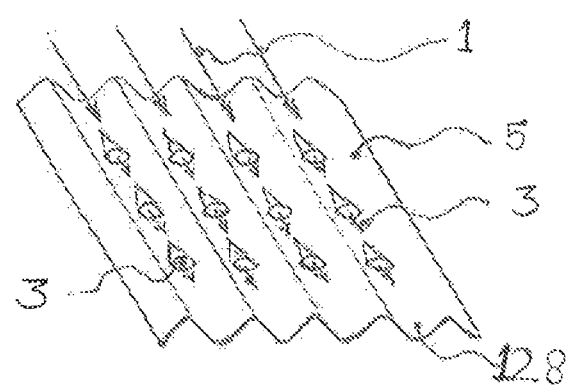
FIG. 7 shows a detail of a corrugated plate with gas passage openings.

FIG. 7 shows a detail of a plate (5), which is provided with gas passage openings, projecting channels and flow openings, and which is corrugated and thus ensures that at a relatively small supply of the liquid, the required velocity and even thickness for the desired venturi-effect is maintained. For this purpose, the in the embodiment shown, preferably louvered, gas passage openings provided with projected channels with flow openings (3) are located at the bottom of the trenches (128) through which the liquid (1) flows down. In these trenches the openings remain, also with a smaller liquid flow through the apparatus completely immersed by the liquid film. Also, in these trenches the flow rate is sufficient for the desired venturi effect.

Figure 8:
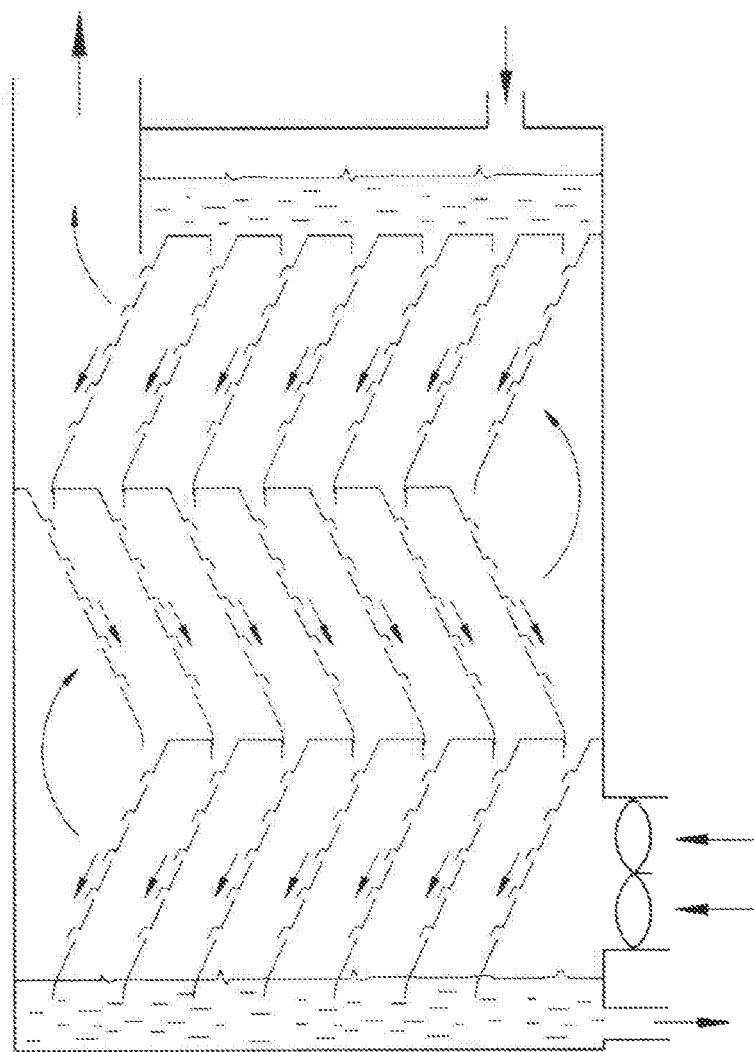
FIG. 8 shows a compact embodiment of the apparatus according to the invention.

FIG. 8 shows a cross-sectional view of a very compact device in which a relatively small flow of gas is contacted intensively with liquid by passing the flow of gas through a series of inclined plates that are provided with gas passage openings. The series of inclined plates have been arranged in a parallel position to each other. The possibility to, supply additional gas between the end of a row of plates and the beginning of the next row of plates if necessary, has not been shown in this Figure.

The invention claimed is:

1. Apparatus for contacting a gas and a liquid, comprising:
 a housing;
 a liquid supply in communication with the housing;
 at least two inclined plates, disposed in the housing, arranged in series and, on a liquid side, in fluid communication with the liquid supply; and
 a gas supply that is in fluid communication with a space at the other, gas side of the plates;
 wherein at least some of the plates are provided with gas passage openings, which openings are arranged downstream of the gas supply and are provided with projecting channels with downstream directed flow openings on the liquid side that is in contact with the liquid,
 wherein the plates are configured such that liquid flows from one plate directly onto a downstream plate via a slit-formed passage in a substantially vertical downwards direction, wherein the such inclined plates are arranged one above the other in a zigzag fashion, and
 wherein the slit-formed passage is formed by a curved surface on at least the downstream plate that overlaps a corresponding upstream plate.

2. The apparatus according to claim 1, wherein the inclined plates have an inclination ranging from 20 to 85° to the horizontal plane.

3. The apparatus according to claim 1, wherein the slit-formed passage is configured by a plate and a ridge of the plate that is arranged downstream thereof.

4. The apparatus according to claim 1, wherein the slit-shaped passages are formed by two plates that gradually narrow the opening between them, thereby providing a tapering opening that creates the slit-formed passage.

5. The apparatus according to claim 4, wherein the tapering opening is formed between the lower end of one plate and the upper end of the next lower plate.

6. The apparatus according to claim 1, wherein at least one distribution element is arranged longitudinally on the plates in the form of a longitudinal ridge or an elevation.

7. The apparatus according to claim 6, wherein the plates are corrugated.

8. The apparatus according to claim 1, further comprising gas heat exchanging means.

9. The apparatus according to claim 8, wherein the gas heat exchanging means comprise condenser elements.

10. The apparatus according to claim 8, wherein the gas heat exchanging means are located within the housing in the spaces through which the gas flows after having left the liquid film.

11. The apparatus according to claim 8, wherein the gas heat exchanging means are located outside the housing and the gas supply is provided which extends from the side of the plate that is in contact with the liquid, via the heat exchanging means and debouches into the space for the gas of the next plate.

12. A method for contacting a gas and a liquid, comprising:
 passing a liquid film over at least two inclined plates that have been arranged in series one above the other in a zigzag fashion, and some of which have been provided with gas passage openings, which openings have been provided with projecting channels with downstream directed flow openings on a liquid side that is in contact with the liquid;
 adjusting a thickness of the liquid film such that the downstream directed flow openings are immersed in the liquid film;
 contacting gas with the liquid film via the gas passage openings; and
 passing the liquid film in a free falling manner from one plate directly onto a downstream plate via a slit-formed passage in a substantially vertical downwards direction,
 wherein the slit-formed passage is formed by a curved surface on at least the downstream plate that overlaps a corresponding upstream plate.

13. The method according to claim 12, wherein the liquid film whilst passing from an upper to a lower plate through the slit-formed passage forms a dynamic seal for the gas.

14. The method according to claim 12, further comprising contacting the gas with the liquid film in one of a cross-flow or counter-current fashion.

15. The method according to claim 14, further comprising, after contacting the gas with the liquid film, subjecting the gas to heat exchange.

* * * * *